(12) United States Patent
Endo et al.

(10) Patent No.: US 10,300,687 B2
(45) Date of Patent: May 28, 2019

(54) ALUMINUM RESIN BONDED BODY AND METHOD FOR PRODUCING SAME

(71) Applicant: NIPPON LIGHT METAL COMPANY, LTD., Tokyo (JP)

(72) Inventors: Masanori Endo, Shizuoka (JP); Reiko Takasawa, Shizuoka (JP); Miyuki Yoshida, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/420,268

(22) PCT Filed: Aug. 6, 2013

(86) PCT No.: PCT/JP2013/071239
§ 371 (c)(1),
(2) Date: Feb. 6, 2015

(87) PCT Pub. No.: WO2014/024877
PCT Pub. Date: Feb. 13, 2014

(65) Prior Publication Data
US 2015/0217545 A1 Aug. 6, 2015

(30) Foreign Application Priority Data
Aug. 7, 2012 (JP) ................................. 2012-174535

(51) Int. Cl.
*B32B 9/00* (2006.01)
*B32B 27/28* (2006.01)
(Continued)

(52) U.S. Cl.
CPC ...... *B32B 27/286* (2013.01); *B29C 45/14311* (2013.01); *B29C 45/14778* (2013.01);
(Continued)

(58) Field of Classification Search
None
See application file for complete search history.

(56) References Cited

U.S. PATENT DOCUMENTS

| 5,531,950 A | 7/1996 | Kimura et al. |
| 6,099,953 A | 8/2000 | Komai et al. |

(Continued)

FOREIGN PATENT DOCUMENTS

| JP | 62-227723 A | 10/1987 |
| JP | H05-51671 A | 3/1993 |

(Continued)

OTHER PUBLICATIONS

JP2006026912A_MT Feb. 2, 2006.*
(Continued)

*Primary Examiner* — Seth Dumbris
(74) *Attorney, Agent, or Firm* — Birch, Stewart, Kolasch & Birch, LLP

(57) ABSTRACT

Provided is an aluminum-resin bonded body that expresses excellent bonding strength and does not show a reduction in the strength after a durability test, thus being able to keep the excellent bonding strength over a long period of time. The aluminum-resin bonded body includes: an aluminum substrate formed of aluminum or an aluminum alloy; an oxygen-containing film containing oxygen, the oxygen-containing film being formed on a surface of the aluminum substrate; and a resin molded body formed of a thermoplastic resin composition containing a thermoplastic resin and an additive, the resin molded body being bonded onto the oxygen-containing film, in which the thermoplastic resin composition contains any one or both of: a thermoplastic resin containing an element having an unshared electron pair in a repeat unit and/or at an end; and an additive containing an element having an unshared electron pair.

10 Claims, 1 Drawing Sheet

(51) Int. Cl.
| | |
|---|---|
| B32B 15/08 | (2006.01) |
| B29C 65/02 | (2006.01) |
| C23C 8/16 | (2006.01) |
| C25D 11/04 | (2006.01) |
| C23C 22/08 | (2006.01) |
| C23C 22/66 | (2006.01) |
| C25D 11/18 | (2006.01) |
| B29C 65/82 | (2006.01) |
| B29C 65/00 | (2006.01) |
| B29C 45/14 | (2006.01) |
| B29C 45/16 | (2006.01) |
| B32B 15/04 | (2006.01) |
| B32B 37/24 | (2006.01) |
| B32B 38/00 | (2006.01) |
| C23C 22/07 | (2006.01) |
| C23C 22/68 | (2006.01) |
| B32B 15/20 | (2006.01) |
| B32B 27/32 | (2006.01) |
| B32B 27/36 | (2006.01) |
| B29C 65/08 | (2006.01) |
| B29C 65/14 | (2006.01) |
| B29C 65/16 | (2006.01) |
| B29C 65/18 | (2006.01) |
| B29C 65/04 | (2006.01) |
| B29C 65/06 | (2006.01) |
| B29K 101/12 | (2006.01) |
| B29K 705/02 | (2006.01) |
| B29L 9/00 | (2006.01) |
| B29L 31/30 | (2006.01) |
| B29L 31/34 | (2006.01) |
| B29L 31/00 | (2006.01) |

(52) U.S. Cl.
CPC ............. *B29C 45/16* (2013.01); *B29C 65/02* (2013.01); *B29C 65/8215* (2013.01); *B29C 66/7392* (2013.01); *B29C 66/7422* (2013.01); *B32B 15/04* (2013.01); *B32B 15/08* (2013.01); *B32B 15/20* (2013.01); *B32B 27/281* (2013.01); *B32B 27/285* (2013.01); *B32B 27/32* (2013.01); *B32B 27/36* (2013.01); *B32B 27/365* (2013.01); *B32B 37/24* (2013.01); *B32B 38/0008* (2013.01); *C23C 8/16* (2013.01); *C23C 22/07* (2013.01); *C23C 22/08* (2013.01); *C23C 22/66* (2013.01); *C23C 22/68* (2013.01); *C25D 11/04* (2013.01); *C25D 11/18* (2013.01); *B29C 65/04* (2013.01); *B29C 65/06* (2013.01); *B29C 65/08* (2013.01); *B29C 65/14* (2013.01); *B29C 65/16* (2013.01); *B29C 65/18* (2013.01); *B29C 66/1122* (2013.01); *B29C 66/474* (2013.01); *B29C 66/71* (2013.01); *B29K 2101/12* (2013.01); *B29K 2705/02* (2013.01); *B29L 2009/003* (2013.01); *B29L 2031/3055* (2013.01); *B29L 2031/34* (2013.01); *B29L 2031/762* (2013.01); *B32B 2037/243* (2013.01); *B32B 2250/03* (2013.01); *B32B 2307/50* (2013.01); *B32B 2307/536* (2013.01); *B32B 2311/24* (2013.01); *B32B 2315/02* (2013.01); *B32B 2367/00* (2013.01); *B32B 2369/00* (2013.01); *B32B 2371/00* (2013.01); *B32B 2377/00* (2013.01); *B32B 2379/08* (2013.01); *B32B 2457/00* (2013.01); *B32B 2509/00* (2013.01); *B32B 2605/08* (2013.01); *C23C 2222/20* (2013.01)

(56) References Cited

U.S. PATENT DOCUMENTS

| | | | | |
|---|---|---|---|---|
| 6,642,321 | B1 * | 11/2003 | Okawa | C08G 2/22 525/398 |
| 2007/0022909 | A1 * | 2/2007 | Kennedy | C09D 183/04 106/287.14 |
| 2008/0088099 | A1 * | 4/2008 | Felix | A63C 5/056 280/14.21 |
| 2009/0086454 | A1 * | 4/2009 | Sakamoto | H05K 1/144 361/796 |
| 2009/0136747 | A1 * | 5/2009 | Kikuchi | B32B 15/08 428/339 |
| 2010/0173125 | A1 | 7/2010 | Malek et al. | |
| 2011/0111214 | A1 | 5/2011 | Endo et al. | |
| 2014/0234631 | A1 | 8/2014 | Iino et al. | |

FOREIGN PATENT DOCUMENTS

| | | | |
|---|---|---|---|
| JP | 11-12762 | A | 1/1999 |
| JP | 2003-103562 | A | 4/2003 |
| JP | 2006-026912 | A | 2/2006 |
| JP | 3954379 | B2 | 8/2007 |
| JP | 4270444 | B2 | 6/2009 |
| JP | 2010-0174372 | A | 8/2010 |
| JP | 2011-076887 | A | 4/2011 |
| JP | 2011-173353 | A | 9/2011 |
| WO | WO 94/09969 | A1 | 5/1994 |
| WO | WO2005037907 | A * | 4/2005 |

OTHER PUBLICATIONS

Susac et. al. Applied Surface Science, 239, 2004, 45-59.*
Diggle et. al. Chemical Reviews, 1969, 365-405.*
The International Preliminary Report on Patentability and English translation of the Written Opinion of the International Searching Authority, dated Feb. 19, 2015, issued in the corresponding International Application No. PCT/JP2013/071239.
International Search Report issued in PCT/JP2013/071239 dated Sep. 24, 2013.

* cited by examiner

ALUMINUM RESIN BONDED BODY AND METHOD FOR PRODUCING SAME

TECHNICAL FIELD

The present invention relates to an aluminum-resin bonded body in which an aluminum substrate formed of aluminum or an aluminum alloy and a resin molded body made of a thermoplastic resin are integrally bonded firmly by injection molding of the thermoplastic resin or thermo-compression bonding, and to a method of producing the same.

BACKGROUND ART

In recent years, in the fields of, for example, various sensor components for automobiles, components for household electrical appliances, and components for industrial equipment, there has been widely used an aluminum-resin bonded body in which an aluminum substrate formed of aluminum or an aluminum alloy, which has high heat dissipating property, and a resin molded body made of a thermoplastic resin, which has high insulation performance, is light in weight, and is inexpensive, are integrally bonded. In addition, its applications have been broadened.

In addition, hitherto, as the aluminum-resin bonded body in which dissimilar materials, i.e., the aluminum substrate and the resin molded body are integrally bonded to each other as described above, there has been used one in which the aluminum substrate and the resin molded body are bonded to each other with an adhesive agent under pressure. Under such circumstances, recently, as a more industrially suitable bonding method, there has been developed a method involving: inserting an aluminum substrate into an injection molding die; and injecting a molten thermoplastic resin onto a surface of the inserted aluminum substrate, thereby bonding the aluminum substrate and a resin molded body to each other simultaneously with molding of the resin molded body by injection molding of the thermoplastic resin, and there have been proposed some methods of bonding the aluminum substrate and the resin molded body to each other more inexpensively, and further improving bonding strength. In addition, many of such proposals involve subjecting a surface of the aluminum substrate to appropriate surface treatment.

For example, the inventors of the present invention have already proposed: an aluminum/resin integrally injection-molded article characterized in that an aluminum shape and a resin molded body are locked with each other through recesses in an aluminum material and fitting portions in a thermoplastic resin (Patent Literature 1); and an aluminum alloy member excellent in resin bonding property characterized by having protrusions each formed of a silicon crystal (Patent Literature 2).

In addition, for example, there have been proposed: a technology involving integrating an aluminum alloy product, which is obtained through pretreatment involving immersion in an aqueous solution of one or more kinds selected from ammonia, hydrazine, and a water-soluble amine compound, with a thermoplastic resin composition by injection molding (Patent Literatures 3 and 4); and a technology involving subjecting a metal to electrochemical surface treatment using, as an electrodeposition solution, an aqueous solution of a triazinedithiol, or a solution thereof using any of various organic solvents as its solvent, and then bonding the surface-treated metal to a rubber or a plastic (Patent Literature 5). Further, there have been proposed: a technology involving applying an adhesive agent onto a metal plate or forming an organic film by surface treatment, and then integrating the metal with a resin by injection molding (Patent Literature 6); and a technology involving treating a surface of a metal with an acid or an alkali, followed by treatment with a silane coupling agent, and then bonding the metal to a resin by injection molding (Patent Literature 7).

CITATION LIST

Patent Literature

[PTL 1] WO 2009/151099 A1
[PTL 2] JP 2010-174372 A
[PTL 3] JP 3954379 B2
[PTL 4] JP 4270444 B2
[PTL 5] JP 05-051671 B
[PTL 6] JP 3016331 B2
[PTL 7] JP 2003-103562 A

Here, in the method described in Patent Literature 3 or 4, which utilizes ammonia, hydrazine, and a water-soluble amine compound, a period of time after the treatment until the injection molding is limited. Accordingly, the method has a problem in that a period of time in which a stable surface state can be kept is short. In addition, the treatment method described in Patent Literature 5 has a problem in that the treatment is complicated. In addition, the method described in Patent Literature 6 or 7 has problems in complexity of the process and high treatment cost.

Incidentally, as described in Patent Literature 1 or Patent Literature 2, the inventors of the present invention have hitherto mainly proposed physical bonding based on fitting by an anchor effect, and proposed, as an approach thereto, a method involving special etching treatment using a treatment bath containing a halogen ion. Such method has no problem in performance such as bonding strength or air-tightness at a bonded portion. However, the method has a different problem in that a gas derived from the halogen is generated during the etching treatment, and hence measures are needed to prevent corrosion of surrounding metal parts and apparatus and contamination of a surrounding environment.

SUMMARY OF INVENTION

Technical Problem

In view of the foregoing, the inventors of the present invention have made extensive studies to develop a method of bonding an aluminum substrate and a resin molded body made of a thermoplastic resin to each other without causing any problem for surrounding equipment and environment, by a simple operation and at low cost, with excellent bonding strength that can be kept over a long period of time. As a result, the inventors have found that, in the formation of an oxygen-containing film containing oxygen, on the surface of an aluminum substrate, and the bonding of a resin molded body formed of a thermoplastic resin composition containing a thermoplastic resin and an additive onto the oxygen-containing film, by using, as the thermoplastic resin composition, one containing any one or both of: a thermoplastic resin containing an element having an unshared electron pair in a repeat unit and/or at an end; and an additive containing an element having an unshared electron pair, firm bonding that is kept over a long period of time is formed between the oxygen-containing film on the surface of the aluminum substrate and the resin molded body in the bonding between the aluminum substrate and the resin molded body by injection molding or thermocompression bonding (bonding between aluminum and the resin). Thus, the inventors have completed the present invention.

Therefore, an object of the present invention is to provide an aluminum-resin bonded body that expresses excellent bonding strength between aluminum and a resin and does not show a reduction in the strength after a durability test, thus being able to keep the excellent bonding strength between aluminum and the resin over a long period of time.

Solution to Problem

That is, according to one embodiment of the present invention, there is provided an aluminum-resin bonded body, including: an aluminum substrate formed of aluminum or an aluminum alloy; an oxygen-containing film containing oxygen, the oxygen-containing film being formed on a surface of the aluminum substrate; and a resin molded body formed of a thermoplastic resin composition containing a thermoplastic resin and an additive, the resin molded body being bonded onto the oxygen-containing film, in which the thermoplastic resin composition contains any one or both of: a thermoplastic resin containing an element having an unshared electron pair in a repeat unit and/or at an end; and an additive containing an element having an unshared electron pair.

According to another embodiment of the present invention, there is provided a method of producing an aluminum-resin bonded body, including: a film-forming step of forming an oxygen-containing film on a surface of an aluminum substrate formed of aluminum or an aluminum alloy; and a resin-molding step of forming a resin molded body on the oxygen-containing film of the surface-treated aluminum substrate obtained in the film-forming step, by injection molding of a thermoplastic resin composition containing a thermoplastic resin and an additive, to produce an aluminum-resin bonded body in which the aluminum substrate and the resin molded body are bonded through intermediary of the oxygen-containing film, the thermoplastic resin composition containing any one or both of: a thermoplastic resin containing an element having an unshared electron pair in a repeat unit and/or at an end; and an additive containing an element having an unshared electron pair.

According to still another embodiment of the present invention, there is provided a method of producing an aluminum-resin bonded body, including: a film-forming step of forming an oxygen-containing film on a surface of an aluminum substrate formed of aluminum or an aluminum alloy; a resin-molding step of forming a resin molded body by injection molding of a thermoplastic resin composition containing a thermoplastic resin and an additive; and an aluminum-resin-bonding step of bonding the resin molded body obtained in the resin-molding step onto the oxygen-containing film of the surface-treated aluminum substrate obtained in the film-forming step, by thermocompression bonding, to produce an aluminum-resin bonded body in which the aluminum substrate and the resin molded body are bonded through intermediary of the oxygen-containing film, the thermoplastic resin composition containing any one or both of: a thermoplastic resin containing an element having an unshared electron pair in a repeat unit and/or at an end; and an additive containing an element having an unshared electron pair.

In the present invention, the material, shape, and the like of the aluminum substrate serving as a base material are not particularly limited as long as the aluminum substrate is formed of aluminum or an aluminum alloy. The material, shape, and the like of the aluminum substrate may be determined on the basis of applications of the aluminum-resin bonded body to be formed using the aluminum substrate and various physical properties required for the applications, such as strength, corrosion resistance, and processability.

In addition, the oxygen-containing film to be formed on the surface of such aluminum substrate in the film-forming step is not particularly limited as long as its adhesiveness with the aluminum substrate is satisfactory. The oxygen-containing film is preferably a film containing a zinc element obtained by zinc-containing film-forming treatment using a zinc ion-containing alkali aqueous solution, or any film selected from: a film containing any one kind or two or more kinds of aluminum compounds selected from the group consisting of $Al(OH)_3$, $AlO(OH)$, $Al_2O_3$, $Al(PO_4)$ $Al_2(HPO_4)_3$, and $Al(H_2PO_4)_3$ derived from aluminum film-forming treatment; a film containing a hydrogen bond between an hydroxy group on an aluminum substrate and a silanol group derived from aluminum film-forming treatment; and a film containing an Al—O—Si bond derived from aluminum film-forming treatment, more preferably a film formed on the surface of the aluminum substrate by laser treatment.

Here, the zinc-containing film-forming treatment to be performed in the film-forming step of forming an oxygen-containing film on a surface of an aluminum substrate only needs to allow a film containing oxygen together with a zinc element in the form of zinc oxide (ZnO), zinc iron oxide (ZnFeO), zinc aluminum oxide (ZnAlO), or the like to be formed on the surface of the aluminum substrate. Thus, when any one or both of the thermoplastic resin and additive, which are contained in the thermoplastic resin composition, contain an element having an unshared electron pair, firm bonding strength between aluminum and the resin is achieved between the oxygen-containing film and the resin molded body to be formed thereon upon molding of the resin molded body by injection molding of the thermoplastic resin composition, or by thermocompression bonding with the resin molded body obtained by molding the thermoplastic resin composition.

In addition, the zinc-containing film-forming treatment using the zinc ion-containing alkali aqueous solution is preferably performed by using a zinc ion-containing alkali aqueous solution containing an alkali hydroxide (MOH) and a zinc ion ($Zn^{2+}$) at a weight ratio ($MOH/Zn^{2+}$) of 1 or more and 100 or less, preferably 2 or more and 20 or less, more preferably 3 or more and 10 or less, and bringing the zinc ion-containing alkali aqueous solution into contact with the surface of the aluminum substrate at normal temperature to form a zinc-containing film containing oxygen on the surface of the aluminum substrate. When the weight ratio ($mOH/Zn^{2+}$) of the alkali hydroxide (MOH) to the zinc ion ($Zn^{2+}$) is less than 1 ($MOH<Zn^{2+}$), zinc is not sufficiently dissolved and hence its effect is not exhibited sufficiently. In contrast, when the weight ratio is more than 100 ($MOH>100 Zn^{2+}$), the dissolution of the aluminum substrate becomes faster than the replacement precipitation of zinc, and thus zinc is hardly precipitated on the surface of the aluminum substrate.

Herein, at least one kind selected from the following alkali hydroxides is preferably used as the alkali source in the zinc ion-containing alkali aqueous solution: sodium hydroxide, potassium hydroxide, and lithium hydroxide. In addition, at least one kind selected from the following compounds is preferably used as the zinc ion source in the zinc ion-containing alkali aqueous solution: zinc oxide, zinc hydroxide, zinc peroxide, zinc chloride, zinc sulfate, and zinc nitrate.

In addition, the zinc ion-containing alkali aqueous solution desirably has an alkali hydroxide concentration of 10 g/L or more and 1,000 g/L or less, preferably 50 g/L or more and 300 g/L or less. In addition, the zinc ion-containing alkali aqueous solution desirably has a zinc ion concentration of 1 g/L or more and 200 g/L or less, preferably 10 g/L or more and 100 g/L or less. When the composition of the zinc ion-containing alkali aqueous solution is adjusted within such range, aluminum and a zinc ion cause a replacement reaction on the surface of the aluminum substrate, and thus aluminum is dissolved and the zinc ion is precipitated as a fine particle. As a result, an oxygen-containing film containing a zinc element is formed on the surface of the aluminum substrate. That is, aluminum is dissolved while forming a recess, zinc is precipitated in the recess, and thus the oxygen-containing film containing a zinc element is formed. Here, when the alkali hydroxide concentration is less than 10 g/L, there arises a problem in that the formation of the oxygen-containing film containing a zinc element becomes insufficient. In contrast, when the alkali hydroxide concentration is more than 1,000 g/L, there arises a problem in that the rate of dissolution of aluminum by the alkali is high and the oxygen-containing film containing a zinc element is not formed. In addition, when the zinc ion concentration is less than 1 g/L, there arises a problem in that the formation of the zinc-containing film takes a long period of time. In contrast, when the zinc ion concentration is more than 200 g/L, there arises a problem in that the rate of precipitation of zinc cannot be controlled and an uneven surface is formed.

Further, as the aluminum film-forming treatment to be performed in the film-forming step of forming an oxygen-containing film on the surface of an aluminum substrate, the following is performed: an oxygen-containing film containing any one kind or two or more kinds of aluminum compounds selected from $Al(OH)_3$, $AlO(OH)$, $Al_2O_3$, $Al(PO_4)$, $Al_2(HPO_4)_3$, $Al(H_2PO_4)_3$, and $AlOSiO_2$ is formed on the surface of the aluminum substrate formed of aluminum or an aluminum alloy by treating the aluminum substrate by any one kind of aluminum film-forming treatment selected from: warm water immersion treatment involving immersion in warm water at 50° C. or more for 60 sec or more; water vapor treatment involving exposure to a water vapor atmosphere under pressurized conditions of 0.1 MPa or more and 1 min or more; phosphoric acid treatment involving immersion in a phosphoric acid-based aqueous solution containing any one kind or two or more kinds of phosphate ion species selected from the group consisting of a phosphate ion, a monohydrogen phosphate ion, and a dihydrogen phosphate ion in the range of from 0.1 to 100 g/L for from 30 sec to 30 min, followed by drying with hot air at from 80 to 400° C. for from 30 sec to 30 min; and anodic oxidation treatment. In addition, as the aluminum film-forming treatment to be performed in the film-forming step, the following is performed: an oxygen-containing film containing a hydrogen bond between an hydroxy group on an aluminum substrate and a silanol group and/or an oxygen-containing film containing an Al—O—Si bond is formed on the surface of the aluminum substrate formed of aluminum or an aluminum alloy by treating the aluminum substrate by any one kind of aluminum film-forming treatment selected from silane coupling treatment and/or silica treatment involving immersion in a solution containing 0.1 to 100 g/L of a silane coupling agent and/or colloidal silica for from 30 sec to 30 min, followed by drying with hot air at from 80 to 400° C. for from 30 sec to 30 min. In addition, any one kind of treatment out of the warm water immersion treatment, the water vapor treatment, the phosphoric acid treatment, the anodic oxidation treatment, the silane coupling treatment, and the silica treatment may be performed alone to form the oxygen-containing film on the surface of the aluminum substrate. Alternatively, as required, any two kinds of treatments thereof may be performed in combination to form a required oxygen-containing film on the surface of the aluminum substrate.

Further, the laser treatment to be performed in the film-forming step of forming an oxygen-containing film on a surface of an aluminum substrate has only to involve causing oxidation by heating the vicinity of the surface of the aluminum substrate, preferably only the vicinity of the surface locally, to a temperature equal to or higher than the melting temperature of the aluminum substrate, to precipitate aluminum oxide ($Al_2O_3$) in the vicinity of the surface of the aluminum substrate so that an oxygen-containing film containing the aluminum oxide ($Al_2O_3$) can be formed. The laser treatment may be performed by, for example, using a laser etching apparatus.

It should be noted that, when the warm water immersion treatment, the water vapor treatment, the phosphoric acid treatment, the anodic oxidation treatment, the silane coupling treatment, and the silica treatment (so-called wet treatments), and the laser treatment are considered as production methods, the laser treatment is suitable for an application in which a surface to be bonded can be partially treated because it is difficult to treat a large area by the laser treatment. On the other hand, the wet treatments, excluding the laser treatment, are suitable for an application in which the entire surface including any other surface than a surface to be bonded can be treated because the treatment of a small area by any of the wet treatments requires the masking of any other surface than a surface to be treated.

The surface-treated aluminum substrate thus obtained in the film-forming step by forming the oxygen-containing film on the surface of the aluminum substrate desirably has an oxygen content, which is measured with an EPMA in a surface layer thereof ranging from an outermost surface to a depth of 3 μm, of 0.1 wt % or more and 20 wt % or less, preferably 0.5 wt % or more and 15 wt % or less, more preferably 1 wt % or more and 10 wt % or less. When the oxygen content in the surface layer of the surface-treated aluminum substrate is less than 0.1 wt %, it may become difficult to achieve sufficient bonding strength between aluminum and the resin. In contrast, when the oxygen content is increased to more than 20 wt %, a difficulty arises in production.

In addition, when the oxygen-containing film is an anodic oxidation coatings, it is desired that its oxygen content be 1 wt % or more and 70 wt % or less, preferably 10 wt % or more and 60 wt % or less, more preferably 25 wt % or more and 55 wt % or less. When the oxygen content in the surface layer of the surface-treated aluminum substrate is less than 1 wt %, there is a problem in that the film becomes too thin to be formed as a uniform film. In contrast, when the oxygen content is increased to more than 70 wt %, a difficulty arises in production.

The oxygen-containing film on the surface of the surface-treated aluminum substrate thus obtained is desirably hydrophilic, and it is desired that its contact angle with a water droplet be preferably 70° or less, more preferably 10° or more and 50° or less, still more preferably 5° or more and 40° or less. When the contact angle of the oxygen-containing film with a water droplet is more than 70°, its bonding with the resin molded body may be weakened owing to the hydrophobization of the surface.

Further, in the bonding with the thermoplastic resin composition containing an unshared electron pair, the oxygen-containing film formed in the film-forming step of the present invention preferably has an OH group in an outermost surface layer thereof because, when the OH group is present in the outermost surface layer of the oxygen-containing film, in the case where the thermoplastic resin and/or additive in the thermoplastic resin composition contains an element or substituent capable of forming a hydrogen bond or undergoing a dehydration reaction with the OH group, the thermoplastic resin and/or additive and the OH group of the oxygen-containing film form the hydrogen bond or an ester bond through the dehydration reaction.

In the present invention, the surface-treated aluminum substrate having the oxygen-containing film on its surface obtained in the film-forming step is subjected to the resin-molding step of integrally bonding a resin molded body onto the oxygen-containing film by injection molding of a thermoplastic resin composition to produce the aluminum-resin bonded body. Alternatively, the resin-molding step of forming a resin molded body by inject ion molding of a thermoplastic resin composition, and the aluminum-resin bonding step of integrally bonding the obtained resin molded body onto the oxygen-containing film of the surface-treated aluminum substrate by thermocompression bonding using means such as laser welding, vibration welding, ultrasonic welding, hot press welding, hot plate welding, non-contact hot plate welding, or high frequency welding are performed to produce the aluminum-resin bonded body.

In addition, in the present invention, as the thermoplastic resin composition to be used in the resin-molding step, there is used a thermoplastic resin composition containing a thermoplastic resin and an additive. The thermoplastic resin composition contains any one or both of: a thermoplastic resin containing an element having an unshared electron pair in a repeat unit and/or at an end; and an additive containing an element having an unshared electron pair. Herein, the element having an unshared electron pair contained in the thermoplastic resin and/or additive is preferably any one kind or two or more kinds selected from sulfur, oxygen, and nitrogen. It should be noted that such element having an unshared electron pair contained in the repeat unit of the thermoplastic resin may be contained in the main chain of the repeat unit, or may be contained in a side chain thereof.

Specific examples of such thermoplastic resin containing an element having an unshared electron pair in a repeat unit and/or at an end include: a sulfur element-containing resin such as polyphenylene sulfide (PPS) or a sulfone-based resin; a polyester-based resin such as polybutylene terephthalate (PET); a liquid crystal polymer; an oxygen atom-containing resin such as a polycarbonate-based resin, a polyacetal-based resin, a polyether-based resin, or a polyphenylene ether-based resin; and a nitrogen atom-containing thermoplastic resin such as polyamide (PA), ABS, polyimide, or polyether imide.

In the present invention, the "additive" contained in the thermoplastic resin composition to be used in the molding of the resin molded body in the resin-molding step refers to a substance except for the thermoplastic resin contained in the thermoplastic resin composition. In addition, of such additives, the additive containing an element having an unshared electron pair is not particularly limited as long as: the additive contains an element having an unshared electron pair; and the additive is one to be used by being added into the thermoplastic resin composition. Examples thereof may include various additives such as an antioxidant, a release agent, a plasticizer, an ultraviolet absorber, a heat stabilizer, an antistatic agent, a dye, a pigment, a lubricant, a silane coupling agent, a filler, and an elastomer that are added for various purposes in consideration of, for example, the production of the thermoplastic resin composition, the moldability and processability of the thermoplastic resin composition, and the characteristics of the resin molded body to be obtained by molding the thermoplastic resin composition.

Herein, the additive containing an element having an unshared electron pair is preferably one in which the element having an unshared electron pair is oxygen and which has a carbon-oxygen bond. In addition, it is desired that the additive having a carbon-oxygen bond be more preferably a carbonyl compound, more specifically one kind or two or more kinds of compounds selected from the group consisting of carboxylic acids, esters, and amides.

In the present invention, in the production of the resin molded body to be bonded onto the surface of the aluminum substrate having the oxygen-containing film described above, a particularly preferred thermoplastic resin composition is such a thermoplastic resin composition that a resin molded body molded therefrom has a peak derived from a carbonyl group (C=O) (around 1,730 $cm^{-1}$) in IR analysis. Specific examples thereof may include RSF10719 and 6150T7 (trade names) manufactured by POLYPLASTICS CO., LTD. and ADMER and TAFMER (trade names) manufactured by Mitsui Chemicals, Inc.

In addition, in the present invention, the oxygen-containing film may be formed on the entire surface of the aluminum substrate serving as a base material, and the resin molded body may be bonded to only a required portion of the obtained surface-treated aluminum substrate by injection molding or by thermocompression bonding. Alternatively, in consideration of cost, the oxygen-containing film may be formed on only part or a required portion of the surface of the aluminum substrate, and the resin molded body may be bonded to the required portion of the obtained surface-treated aluminum substrate by injection molding or by thermocompression bonding. In addition, when the oxygen-containing film is formed on only part or a required portion of the surface of the aluminum substrate, it is recommended to: mask portions except for the portion on which the oxygen-containing film is to be formed with a masking tape or the like; then perform treatment for forming the oxygen-containing film; and subsequently remove the masking tape or the like of the masked portion.

In the method of producing an aluminum-resin bonded body in the present invention, as required, prior to the film-forming step of forming an oxygen-containing film, any one or more kinds of treatments selected from degreasing treatment, etching treatment, desmutting treatment, chemical polishing treatment, and electrolytic polishing treatment may be performed as pretreatment for the surface of the aluminum substrate.

The degreasing treatment to be performed as the pretreatment may be performed using a general degreasing bath containing sodium hydroxide, sodium carbonate, sodium phosphate, a surfactant, and the like under the treatment conditions of generally an immersion temperature of 15° C. or more and 55° C. or less, preferably 25° C. or more and 40° C. or less, and an immersion time of 1 min or more and 10 min or less, preferably 3 min or more and 6 min or less.

In addition, the etching treatment to be performed as the pretreatment is generally performed using an aqueous solution of an alkali such as sodium hydroxide, or an acid aqueous solution such as a mixed aqueous solution of sulfuric acid and phosphoric acid. In addition, when the alkali aqueous solution is used, it is recommended to perform immersion treatment using an alkali aqueous solution having a concentration of 20 g/L or more and 200 g/L or less, preferably 50 g/L or more and 150 g/L or less under the treatment conditions of an immersion temperature of 30° C. or more and 70° C. or less, preferably 40° C. or more and 60° C. or less, and a treatment time of 0.5 min or more and 5 min or less, preferably 1 min or more and 3 min or less. In addition, when the mixed aqueous solution of sulfuric acid and phosphoric acid as the acid aqueous solution is used, it is recommended to perform immersion treatment using a solution having a sulfuric acid concentration of 10 g/L or more and 500 g/L or less, preferably 30 g/L or more and 300 g/L or less, and a phosphoric acid concentration of 10 g/L or more and 1,200 g/L or less, preferably 30 g/L or more and 500 g/L or less under the treatment conditions of an immersion temperature of 30° C. or more and 110° C. or less, preferably 55° C. or more and 75° C. or less, and an immersion time of 0.5 min or more and 15 min or less, preferably 1 min or more and 6 min or less.

Further, for the desmutting treatment to be performed as the pretreatment, it is desired to perform, for example, immersion treatment using a desmutting bath containing an aqueous solution of nitric acid having a concentration of from 1 to 30% under the treatment conditions of an immersion temperature of 15° C. or more and 55° C. or less, preferably 25° C. or more and 40° C. or less, and an immersion time of 1 min or more and 10 min or less, preferably 3 min or more and 6 min or less.

It should be noted that a hitherto known method may be adopted for the chemical polishing treatment or electrolytic polishing treatment to be performed as the pretreatment.

Although the principle behind the bonding between the aluminum substrate and the resin molded body in the present invention still has many unknown aspects, the inventors generally consider as described below on the basis of the following verification results.

That is, a plurality of surface-treated aluminum substrates each having an oxygen-containing film on the surface of an aluminum substrate were formed. Some of the surface-treated aluminum substrates were each treated as follows: a PPS molded body was bonded onto its surface by injection molding of polyphenylene sulfide (PPS) having a carbonyl group (C=O) to provide an aluminum-PPS bonded body. The other surface-treated aluminum substrates were each treated as follows: first, stearic acid was volatilized in an electric furnace kept at 100° C., the surface-treated aluminum substrate was exposed therein for 24 hr to provide a stearic acid-treated aluminum substrate having a monomolecular film of stearic acid on the oxygen-containing film, and a PPS molded body was bonded onto the surface of the stearic acid-treated aluminum substrate by injection molding of PPS having a carbonyl group (C=O) to provide a stearic acid-treated aluminum-PPS bonded body. Measurement was performed for a difference in bonding strength between the aluminum-PPS bonded body and the stearic acid-treated aluminum-PPS bonded body.

The result was as follows: the bonding strength in the stearic acid-treated aluminum-PPS bonded body was evidently reduced as compared to the bonding strength of the aluminum-PPS bonded body.

Stearic acid has both a carboxyl group (COOH), which is a hydrophilic group, and an alkyl group ($C_{17}H_{35}$), which is a hydrophobic group, and has property of forming a monomolecular film, which is one molecule thick. It is considered that, in the stearic acid-treated aluminum-PPS bonded body, the oxygen-containing film of the aluminum substrate and the carboxyl group side of stearic acid formed chemical bonding, the alkyl group side was thus brought into contact with the PPS molded body, chemical bonding between the aluminum substrate and the PPS molded body was consequently inhibited, and hence the bonding strength reduced as compared to the bonding strength of the aluminum-PPS bonded body.

In addition, the surfaces of the surface-treated aluminum substrate before and after stearic acid treatment were observed and investigated in a comparative manner, but no difference was found in the structure of the surface irrespective of the presence or absence of the monomolecular film of stearic acid. On the other hand, when a liquid droplet was dropped onto the surface-treated aluminum substrate after the stearic acid treatment, and the contact angle therebetween was measured, the contact angle was close to 120°, and the liquid droplet adopted a substantially spherical shape. The results support the localization of the alkyl group side of stearic acid on the outermost surface layer side of the aluminum substrate.

It is considered from the foregoing that, between the surface-treated aluminum substrate and the resin molded body having a carbonyl group (C=O) in the aluminum-resin bonded body of the present invention, chemical bonding is formed between the oxygen of the oxygen-containing film and the carbonyl group in the resin, and an action by the chemical bonding expresses an enhancing effect on the bonding strength between the aluminum substrate and the resin molded body.

Advantageous Effects of Invention

The aluminum-resin bonded body of the present invention is obtained by: coating the surface of the aluminum substrate with the oxygen-containing film; and then bonding the resin molded body onto the oxygen-containing film on the surface of the aluminum substrate by injection molding of the thermoplastic resin composition containing an element having an unshared electron pair in the thermoplastic resin and/or additive, or by thermocompression bonding of the resin molded body obtained through injection molding of the thermoplastic resin composition. Accordingly, the aluminum substrate and the resin molded body are firmly bonded through the intermediary of the oxygen-containing film, and moreover, excellent bonding strength between aluminum and the resin can be kept over a long period of time.

In addition, according to the method of producing an aluminum-resin bonded body of the present invention, in the film-forming step of forming an oxygen-containing film on a surface of an aluminum substrate, gas generation and the like do not occur and the operation can be performed at normal temperature, causing no problem for the surrounding equipment and environment, and an aluminum-resin bonded body that can exhibit excellent bonding strength between aluminum and the resin over a long period of time can be produced by a simple operation and at low cost.

DESCRIPTION OF EMBODIMENTS

Figure 1:
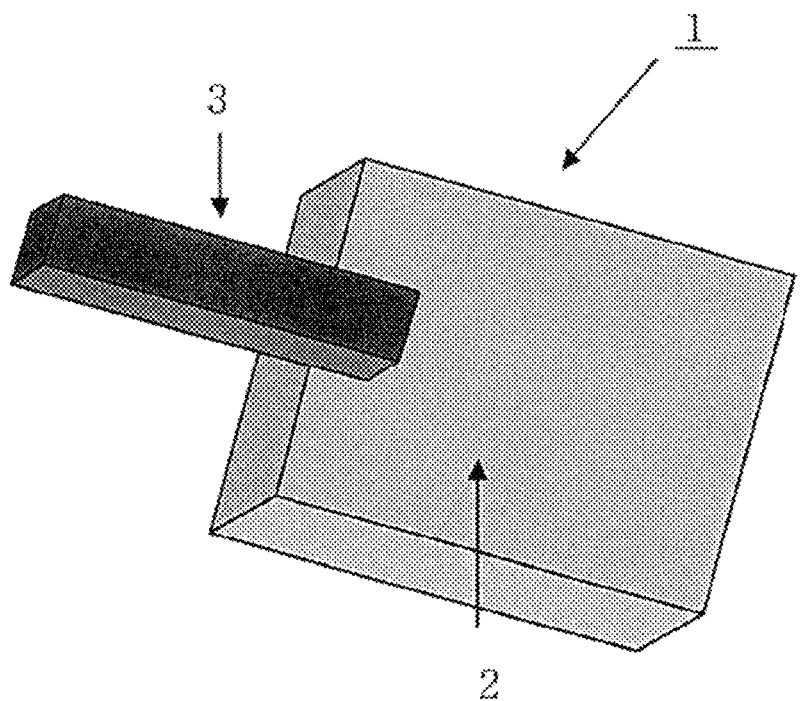
FIG. 1 is an explanatory diagram for illustrating an aluminum-resin bonded body produced in Example 1 of the present invention.

An aluminum-resin bonded body and method of producing the same of the present invention are specifically described below on the basis of Examples and Comparative Examples.

Example 1

(1) Production of Surface-Treated Aluminum Substrate

An aluminum substrate measuring 40 mm×40 mm was cut out of a commercially available aluminum plate (A5052; plate thickness: 2.0 mm). In addition, a zinc ion-containing aqueous solution of sodium having a sodium hydroxide concentration of 100 g/L and a zinc oxide concentration of 25 g/L (20 g/L in terms of $Zn^+$) was prepared as a film-forming treatment agent. Next, the aluminum substrate was immersed in the zinc ion-containing aqueous solution of sodium under room temperature for 3 min, and then washed with water to produce a surface-treated aluminum substrate for tests having formed on its surface an oxygen-containing film containing a zinc element.

(2) Measurement of Thickness of Oxygen-Containing Film

The obtained surface-treated aluminum substrate was embedded and fixed in an epoxy resin, and then the surface-treated aluminum substrate was Cut together with the epoxy resin. The cross-section was subjected to wet polishing with emery paper and mirror-finished by buff polishing using a magnesium oxide-based polish. After that, the resultant cross-section after the wet polishing was observed with an SEM (FE-SEM manufactured by Carl Zeiss; 50,000×) and the thickness of its film portion was measured.

Table 1 shows the result.

(3) Measurement of Oxygen Content in Film

The obtained surface-treated aluminum substrate was subjected to mapping analysis with an EPMA (manufactured by SHIMADZU: EPMA1610) involving measurement in 512 steps in each of vertical and horizontal directions at an irradiation diameter of 40 μm/step. Here, the measurement area is 20.48 mm×20.48 mm, the sampling time per step is 20 ms, the accelerating voltage is 15 kV, and the resolution of oxygen in a depth direction is 3 μm or less. Next, the detected oxygen intensity was calculated in terms of weight percentage (wt %) on the basis of a calibration curve prepared in advance. It should be noted that the calibration curve used was prepared on the basis of the following two points: the oxygen intensity of an $Al_2O_3$ standard sample (oxygen content: 48 wt %) and the oxygen intensity of a high-purity Al foil.

Table 1 shows the result.

(4) Measurement of Contact Angle of Surface-Treated Aluminum Substrate

The surface (oxygen-containing film) of the obtained surface-treated aluminum substrate was measured for its contact angle with a water droplet. The contact angle was measured by a droplet method involving using an automatic contact angle meter DM-701 (manufactured by Kyowa Interface Science Co., Ltd.). About 2 μL of pure water were dropped onto the surface of the surface-treated aluminum substrate, and a contact angle in this case was measured. As a result, the contact angle with the water droplet was found to be 20°.

Table 1 shows the result.

(5) Measurement of Substance Present in Outermost Surface Layer of Oxygen-Containing Film A substance present in the outermost surface layer of the oxygen-containing film of the obtained surface-treated aluminum substrate was analyzed by GD-OES analysis (elemental analysis involving using a glow discharge-optical emission spectrometer; see A. Bengtson: J. Anal. At. Spectrom, 18(2003), 1066). As a result, a Bi element was detected. In the elemental analysis by GD-OES, the Bi element is known to correspond to an OH group. The Al alloy and each treatment liquid used contain no Bi, and hence the detection of Bi means the presence of an OH group.

Table 1 shows the result.

(6) Production of Aluminum-Resin Bonded Body

PPS (manufactured by POLYPLASTICS CO., LTD., trade name: FORTRON, grade name: RSF10719, C=O group: present) was used as a thermoplastic resin, the surface-treated aluminum substrate for tests obtained in the foregoing was set in a die of an injection molding machine, and injection molding of PPS was performed under the injection molding conditions of a die temperature of 150° C., a resin temperature of 320° C., an injection speed of 100 mm/s, a dwell pressure of 50 MPa, and a pressure dwell time of 3 sec. Thus, as illustrated in FIG. 1, a PPS molded body 3 measuring 5 mm×10 mm×30 mm was molded, and the PPS molded body 3 was bonded onto the zinc-containing film (not shown) of a surface-treated aluminum substrate 2 in an area of 5 mm×10 mm to produce an aluminum-resin bonded body 1 for tests.

(7) IR Analysis of Resin Portion of Aluminum-Resin Bonded Body

The aluminum-resin bonded bodies 1 for tests thus produced were each subjected to IR analysis of a resin molded body portion using an IR analysis apparatus (Agilent Technologies 660 FastImage-IR) by a micro-ATR method to confirm the presence or absence of a peak derived from a carbonyl group (C=O) (around 1,730 $cm^{-1}$). The result was as shown in Table 1. Specifically, a peak derived from a carbonyl group (C=O) was detected.

(8) Evaluation Test for Bonding Strength of Aluminum-Resin Bonded Body Before and after Durability Test The aluminum-resin bonded bodies for tests thus produced were each subjected to a durability test for an aluminum-resin bonded body involving: leaving the aluminum-resin bonded body to stand under an environment having a temperature of 85° C. and a humidity of 85% for 1,000 hr; and evaluating the corrosion resistance of the aluminum-resin bonded body. The aluminum-resin bonded bodies after the durability test were each subjected to an evaluation test for bonding strength between aluminum and the resin by the following method.

Figure 2:
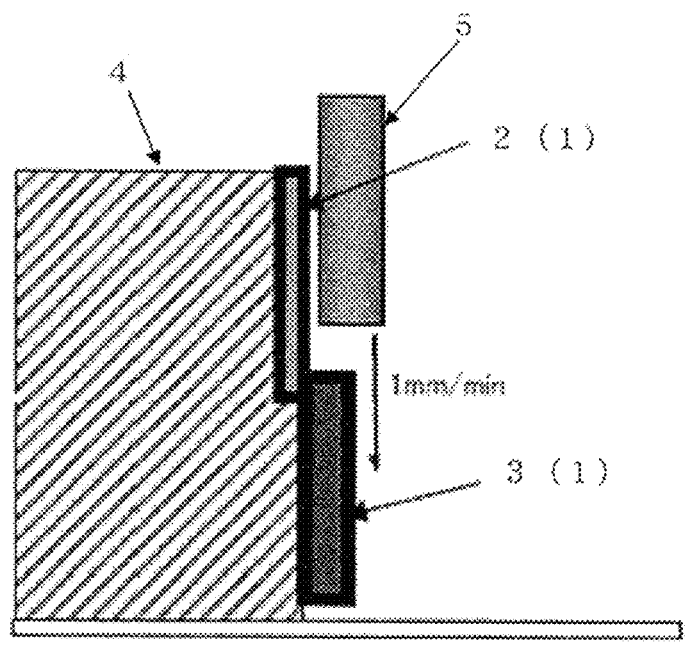
FIG. 2 is an explanatory diagram for illustrating a method for an evaluation test for bonding strength between aluminum and a resin carried out in Example 1 of the present invention.

As illustrated in FIG. 2, a test for evaluating the shear strength of the bonded portion of an aluminum-resin bonded body was carried out by a method involving: fixing the surface-treated aluminum substrate 2 of the aluminum-resin bonded body 1 to a jig 4; and applying a load 5 to the upper end of the PPS molded body 3 from thereabove at a speed of 1 mm/min. to break the bonded portion between the surface-treated aluminum substrate 2 and the PPS molded body 3. The fracture surface in that case was observed, and the bonding strength of the aluminum-resin bonded body before and after the durability test was evaluated in accordance with the following criteria: ◯: the case where the entire bonded surface was broken through the cohesive failure of the resin; Δ: the case where part of the bonded surface was broken through the cohesive failure of the resin; and x: the case where the bonded portion was broken at the interface between the aluminum substrate and the PPS molded body.

Table 1 shows the result.

(9) Surface Hardness Measurement and Bending Evaluation of Aluminum-Resin Bonded Body The produced aluminum-resin bonded body for tests was measured for its Vickers hardness (Hv) as a surface hardness in conformity with the Vickers hardness test method of JIS 22244, and was investigated for the presence or absence of a film defect in conformity with the press bending method of JIS 22248.

Table 1 shows the results.

Examples 2 to 9

Aluminum-resin bonded bodies for tests were produced in the same manner as in Example 1 except that: as the aluminum substrate, the same aluminum plate as that of Example 1 (A5052; plate thickness: 2.0 mm) was used in each of Examples 2 to 7, an aluminum plate (A1050; plate thickness: 2.0 mm) was used in Example 8, and an aluminum plate (ADC12; plate thickness: 2.0 mm) was used in Example 9; and aqueous solutions having liquid compositions shown in Table 1 were used as the zinc ion-containing alkali aqueous solution, and the alkali hydroxide concentration and the zinc ion concentration were set to concentrations shown in Table 1. Then, IR analysis of a resin portion and an evaluation test for bonding strength were performed in the same manner as in Example 1.

Table 1 shows the results.

Examples 10 and 11

As the aluminum substrate, the same aluminum plate as that of Example 1 (A5052; plate thickness: 2.0 mm) was used in Example 10, and the same aluminum plate as that of Example 9 (ADC12; plate thickness: 2.0 mm) was used in Example 11. The aluminum substrate was subjected to pretreatment involving immersion in a 30 wt % aqueous solution of nitric acid at normal temperature for 5 min, followed by sufficient water washing with ion-exchanged water, subsequent immersion in a 5 wt % solution of sodium hydroxide at 50° C. for 1 min, followed by water washing, and further immersion in a 30 wt % aqueous solution of nitric acid at normal temperature for 3 min, followed by water washing. Next, hydration treatment involving immersion in hot water at 91° C. for 5 min was performed. Thus, aluminum film-forming treatment was performed to form an oxygen-containing film containing an aluminum compound AlO(OH) on the surface of the aluminum substrate. Aluminum-resin bonded bodies for tests were produced in the same manner as in Example 1 except for the foregoing. Then, IR analysis of a resin portion and an evaluation test for bonding strength were performed in the same manner as in Example 1.

Table 1 shows the results.

Example 12

The same aluminum plate as that of Example 1 (A5052; plate thickness: 2.0 mm) was used as the aluminum substrate. The aluminum substrate was subjected to degreasing treatment with 2% SURFCLEANER 53S (manufactured by Nippon Paint Co., Ltd.) at 60° C. for 30 sec, followed by water washing, and was dried at 80° C. Colloidal silica ST-O (manufactured by Nissan Chemical Industries, Ltd.) was used as $SiO_2$ and phosphoric acid having a purity of 85% (manufactured by Wako Pure Chemical Industries, Ltd.) was used as $H_3PO_4$ to produce a surface treatment liquid blended at a ratio shown in Table 1, and aluminum film-forming treatment was performed, which involved immersing the aluminum substrate in the surface treatment liquid at room temperature for 10 sec, followed by drying at 80° C. Thus, an oxygen-containing film containing an aluminum compound $Al(PO_4)$ and a hydrogen bond between an hydroxy group on an aluminum substrate and a silanol group was formed on the surface of the aluminum substrate. An aluminum-resin bonded body for tests was produced in the same manner as in Example 1 except for the foregoing. Then, IR analysis of a resin portion and an evaluation test for bonding strength were performed in the same manner as in Example 1.

Table 1 shows the results.

Example 13

The same aluminum plate as that of Example 1 (A5052; plate thickness: 2.0 mm) was used as the aluminum substrate. The aluminum substrate was subjected to degreasing treatment with 2% SURFCLEANER 53S (manufactured by Nippon Paint Co., Ltd.) at 60° C. for 30 sec, followed by water washing, and was dried at 80° C. Colloidal silica ST-O (manufactured by Nissan Chemical Industries, Ltd.) was used as $SiO_2$, phosphoric acid having a purity of 85% (manufactured by Wako Pure Chemical Industries, Ltd.) was used as $H_3PO_4$, and a silane coupling agent (KBM-803 manufactured by Shin-Etsu Chemical Co., Ltd.) was used to produce a surface treatment liquid blended at a ratio shown in Table 1, and aluminum film-forming treatment was performed, which involved immersing the aluminum substrate in the surface treatment liquid at room temperature for 10 sec, followed by drying at 120° C. Thus, an oxygen-containing film containing an aluminum compound $Al(PO_4)$, a hydrogen bond between an hydroxy group on an aluminum substrate and a silanol group, and an Al—O—Si bond was formed on the surface of the aluminum substrate. An aluminum-resin bonded body for tests was produced in the same manner as in Example 1 except for the foregoing. Then, IR analysis of a resin portion and an evaluation test for bonding strength were performed in the same manner as in Example 1.

Table 1 shows the results.

Examples 14 and 15

Aluminum-resin bonded bodies for tests were produced in the same manner as in Example 1 except that: as the aluminum substrate, the same aluminum plate as that of Example 1 (A5052; plate thickness: 2.0 mm) was used in Example 14, and the same aluminum plate as that of Example 9 (ADC12; plate thickness: 2.0 mm) was used in Example 15; and the aluminum substrate was irradiated in a single direction at a pitch of 50 μm by laser etching treatment (apparatus name: Miyachi Technos/ML-7112A, laser light wavelength: 1,064 nm, spot diameter: 50 to 60 μm, oscillation mode: Q-switch pulse, frequency: 10 kHz) to form a thermally oxidized film (oxygen-containing film) in the surface layer. Then, IR analysis of a resin portion and an evaluation test for bonding strength were performed in the same manner as in Example 1.

Table 1 shows the results.

Example 16

As the aluminum substrate, the same aluminum plate as that of Example 1 (A5052; plate thickness: 2.0 mm) was used. The aluminum substrate was subjected to pretreatment involving immersion in a 30 wt % aqueous solution of nitric acid at normal temperature for 5 min, followed by sufficient water washing with ion-exchanged water, subsequent immersion in a 5 wt % solution of sodium hydroxide at 50° C. for 1 min, followed by water washing, and further immersion in a 30 wt % aqueous solution of nitric acid at normal temperature for 3 min, followed by water washing. Next, aluminum film-forming treatment was performed, which involved anodic oxidation in a solution having a sulfuric acid concentration of 160 g/L at a melting temperature of 18° C. and a DC voltage of 20 V so as to achieve a film thickness of 10 μm, followed by water washing, and drying with hot air at 120° C. for 5 min. Thus, an oxygen-containing film containing an aluminum compound $Al_2O_3$ was formed on the surface of the aluminum substrate. An aluminum-resin bonded body for tests was produced in the same manner as in Example 1 except for the foregoing. Then, IR analysis of a resin portion and an evaluation test for bonding strength were performed in the same manner as in Example 1.

Example 17

An oxygen-containing film containing an aluminum compound AlO(OH) was formed on the surface of an aluminum substrate in the same manner as in Example 10 except that the conditions of the hydration treatment of Example 10 were changed to the conditions of immersion in hot water at 80° C. for 5 min. After that, an aluminum-resin bonded body for tests was produced in the same manner as in Example 1. Then, IR analysis of a resin portion and an evaluation test for bonding strength were performed in the same manner as in Example 1.

Table 1 shows the results.

Example 18

Anodic oxidation was performed in a solution having a sulfuric acid concentration of 160 g/L at a melting temperature of 18° C. and a DC voltage of 20 V so as to achieve a film thickness of 2 μm. Thus, an oxygen-containing film containing an aluminum compound $Al_2O_3$ was formed on the surface of an aluminum substrate. After that, an aluminum-resin bonded body for tests was produced in the same manner as in Example 1. Then, IR analysis of a resin portion and an evaluation test for bonding strength were performed in the same manner as in Example 1.

Table 1 shows the results.

Comparative Examples 1 and 2

Aluminum-resin bonded bodies for tests according to Comparative Examples 1 and 2 were produced in the same manner as in Example 1 above except that materials shown in Table 2 were used as the thermoplastic resin. In addition, IR analysis of a resin portion and an evaluation test for bonding strength were performed in the same manner as in Example 1.

Table 2 shows the results.

Comparative Example 3

An aluminum-resin bonded body for tests was produced in the same manner as in Example 10 above except that a material shown in Table 2 was used as the thermoplastic resin. Then, IR analysis of a resin portion and an evaluation test for bonding strength were performed in the same manner as in Example 1.

Table 2 shows the results.

Comparative Example 4

An aluminum-resin bonded body for tests was produced in the same manner as in Example 1 except that: the same aluminum plate as that of Example 1 (A5052; plate thickness: 2.0 mm) was used as the aluminum substrate; and the aluminum substrate was immersed in a 30 wt % aqueous solution of nitric acid at normal temperature for 5 min, followed by sufficient water washing with ion-exchanged water, and was dried, to form an aluminum substrate having a naturally oxidized film on the surface of the aluminum substrate. Then, IR analysis of a resin portion and an evaluation test for bonding strength were performed in the same manner as in Example 1.

Table 2 shows the results.

Comparative Example 5

An aluminum-resin bonded body for tests was produced in the same manner as in Example 1 except that: a material shown in Table 2 was used as the thermoplastic resin; and a thermally oxidized film was formed in the surface layer by laser treatment in the same manner as in Example 14 above. Then, IR analysis of a resin portion and an evaluation test for bonding strength were performed in the same manner as in Example 1.

Table 2 shows the results.

Comparative Example 6

An aluminum-resin bonded body for tests was produced in the same manner as in Example 1 above except that: a material shown in Table 2 was used as the thermoplastic resin; and an oxygen-containing film containing a zinc element was formed on the surface, followed by heat treatment at 150° C. for 1 hr. Then, IR analysis of a resin portion and an evaluation test for bonding strength were performed in the same manner as in Example 1.

Table 2 shows the results.

Comparative Example 7

An aluminum-resin bonded body for tests was produced in the same manner as in Example 1 above except that: a material shown in Table 2 was used as the thermoplastic resin; and aluminum film-forming treatment was performed by changing the hydration treatment of Example 10 above to treatment involving immersion in hot water at 70° C. for 5 min to form an oxygen-containing film containing an aluminum compound AlO(OH) on the surface of the aluminum substrate. Then, IR analysis of a resin portion and an evaluation test for bonding strength were performed in the same manner as in Example 1.

Table 2 shows the results.

Comparative Example 8

An aluminum-resin bonded body for tests was produced in the same manner as in Example 1 above except that: a material shown in Table 2 was used as the thermoplastic resin; and aluminum film-forming treatment was performed by changing the hydration treatment of Example 10 above to treatment involving immersion in hot water at 60° C. for 10 min to form an oxygen-containing film containing an aluminum compound AlO(OH) on the surface of the aluminum substrate. Then, IR analysis of a resin portion and an evaluation test for bonding strength were performed in the same manner as in Example 1.

Table 2 shows the results.

TABLE 1

| Example No. | Composition of treatment liquid for film formation | Oxygen-containing film | | | | Substance present in outermost surface layer | Resin molded body | | Evaluation for bonding strength | | Surface hardness | Bending evaluation |
| | | Kind of film | Thickness of film (μm) | Oxygen content (wt %) | Contact angle (°) | | Kind of resin composition | Presence or absence of C=O group | Fracture load (N) | Form of fracture | Vickers hardness (Hv) | Presence or absence of film defect |
| --- | --- | --- | --- | --- | --- | --- | --- | --- | --- | --- | --- | --- |
| 1 | NaOH: 100 g/L; Zn²⁺: 20 g/L | ZnO | 0.5 | 3 | 20 | OH | RSF10719 (*1) | Present | 1,800 | ○ | 81 | Absent |
| 2 | NaOH: 100 g/L; Zn²⁺: 100 g/L | ZnO | 1 | 8 | 10 | OH | RSF10719 | Present | 1,800 | ○ | 82 | Absent |
| 3 | NaOH: 500 g/L; Zn²⁺: 10 g/L | ZnO | 0.2 | 0.8 | 30 | OH | RSF10719 | Present | 1,400 | ○ | 81 | Absent |
| 4 | NaOH: 300 g/L; Zn²⁺: 30 g/L | ZnO | 0.4 | 2.4 | 25 | OH | RSF10719 | Present | 1,700 | ○ | 82 | Absent |
| 5 | NaOH: 10 g/L; Zn²⁺: 1 g/L | ZnO | 0.2 | 0.1 | 60 | OH | RSF10719 | Present | 1,300 | ○ | 80 | Absent |
| 6 | LiOH: 100 g/L; Zn²⁺: 20 g/L | ZnO | 0.4 | 1.6 | 45 | OH | RSF10719 | Present | 1,500 | ○ | 81 | Absent |
| 7 | KOH: 100 g/L; Zn²⁺: 20 g/L | ZnO | 0.4 | 1.6 | 46 | OH | RSF10719 | Present | 1,550 | ○ | 82 | Absent |
| 8 | NaOH: 100 g/L; Zn²⁺: 20 g/L | ZnO | 0.4 | 1.6 | 44 | OH | RSF10719 | Present | 1,600 | ○ | 80 | Absent |
| 9 | NaOH: 100 g/L; Zn²⁺: 20 g/L | ZnO | 0.5 | 0.3 | 55 | OH | RSF10719 | Present | 900 | ○ | 91 | Absent |
| 10 | H₂O | AlO(OH) | 0.5 | 8 | 9 | OH | RSF10719 | Present | 1,800 | ○ | 81 | Absent |
| 11 | H₂O | AlO(OH) | 0.5 | 0.2 | 18 | OH | RSF10719 | Present | 1,100 | ○ | 92 | Absent |
| 12 | H₃PO₄: 0.5 g/L; SiO₂: 4.5 g/L | Al(PO₄) (*2) | 0.5 | 3 | 11 | OH | RSF10719 | Present | 1,500 | ○ | 80 | Absent |
| 13 | H₃PO₄: 0.25 g/L SiO₂: 2.25 g/L KBM-803 (*3): 1.25 g/L | Al(PO₄) (*2) (*6) | 0.5 | 4 | 11 | OH | RSF10719 | Present | 1,500 | ○ | 80 | Absent |
| 14 | Dry (laser) | Al₂O₃ | 1 | 8 | 15 | OH | RSF10719 | Present | 1,800 | ○ | 80 | Absent |
| 15 | Dry (laser) | Al₂O₃ | 1 | 8 | 16 | OH | RSF10719 | Present | 1,800 | ○ | 80 | Absent |
| 16 | H₂SO₄: 160 g/L | Al₂O₃ | 10 | 53 | 10 | OH | RSF10719 | Present | 900 | ○ | 250 | Present |
| 17 | H₂O | AlO(OH) | 0.3 | 4 | 20 | OH | RSF10719 | Present | 1,100 | ○ | 81 | Absent |
| 18 | H₂SO₄: 160 g/L | Al₂O₃ | 2 | 12 | 10 | OH | RSF10719 | Present | 900 | ○ | 250 | Present |

(Note)
(*1): PPS manufactured by POLYPLASTICS CO., LTD.,
(*2): hydrogen bond between hydroxy group on an aluminum substrate and silanol group,
(*3): silane coupling agent manufactured by Shin-Etsu Chemical Co., Ltd.,
(*6): Al—O—Si bond.

TABLE 2

| Comparative Example No. | Composition of treatment liquid for film formation | Oxygen-containing film | | | | Substance present in outermost surface layer | Resin molded body | | Evaluation for bonding strength | | Surface hardness | Bending evaluation |
| | | Kind of film | Thickness of film (μm) | Oxygen content (wt %) | Contact angle (°) | | Kind of resin composition | Presence or absence of C=O group | Fracture load (N) | Form of fracture | Vickers hardness (Hv) | Presence or absence of film defect |
| --- | --- | --- | --- | --- | --- | --- | --- | --- | --- | --- | --- | --- |
| 1 | NaOH: 100 g/L Zn²⁺: 20 g/L | ZnO | 0.5 | 3 | 20 | OH | 1140 (*4) | Absent | 200 | x | 81 | Absent |

TABLE 2-continued

| | Composition of treatment liquid for film formation | Oxygen-containing film | | | | | Resin molded body | | Evaluation for bonding strength | | Surface hardness | Bending evaluation |
|---|---|---|---|---|---|---|---|---|---|---|---|---|
| Comparative Example No. | | Kind of film | Thickness of film (μm) | Oxygen content (wt %) | Contact angle (°) | Substance present in outermost surface layer | Kind of resin composition | Presence or absence of C=O group | Fracture load (N) | Form of fracture | Vickers hardness (Hv) | Presence or absence of film defect |
| 2 | NaOH: 100 g/L Zn$^{2+}$: 20 g/L | ZnO | 0.5 | 3 | 20 | OH | A575W20 (*5) | Absent | 300 | x | 81 | Absent |
| 3 | H$_2$O | AlO(OH) | 0.5 | 8 | 9 | OH | A575W20 | Absent | 700 | x | 82 | Absent |
| 4 | 30 wt %-HNO$_3$ | Al$_2$O$_3$ | 0.005 | 0.02 | 90 | N | RSF10719 (*1) | Present | 50 | x | 81 | Absent |
| 5 | Dry (laser) | Al$_2$O$_3$ | 1 | 8 | 15 | OH | A575W20 | Absent | 600 | x | 80 | Absent |
| 6 | NaOH: 100 g/L Zn$^{2+}$: 20 g/L | ZnO | 0.5 | 5 | 120 | Zn | RSF10719 | Present | 600 | x | 80 | Absent |
| 7 | H$_2$O | AlO(OH) | 0.01 | 0.05 | 18 | OH | RSF10719 | Present | 400 | x | 81 | Absent |
| 8 | H$_2$O | AlO(OH) | 0.01 | 0.05 | 20 | OH | RSF10719 | Present | 300 | x | 80 | Absent |

(Note)
(*1): PPS manufactured by POLYPLASTICS CO., LTD.,
(*4): PPS manufactured by POLYPLASTICS CO., LTD.,
(*5): PPS manufactured by TORAY INDUSTRIES, INC.

INDUSTRIAL APPLICABILITY

The aluminum-resin bonded body of the present invention has excellent bonding strength both before and after a durability test, and hence can be suitably utilized in the production of various components such as various sensor components for automobiles, components for household electrical appliances, and components for industrial equipment.

REFERENCE SIGNS LIST

1 . . . aluminum-resin bonded body, 2 . . . surface-treated aluminum substrate, 3 . . . PPS molded body (resin molded body), 4 . . . jig, 5 . . . load.

The invention claimed is:

1. An aluminum-resin bonded body, comprising:
   an aluminum substrate formed of aluminum or an aluminum alloy;
   an oxygen-containing film containing oxygen, the oxygen-containing film being formed on a surface of the aluminum substrate; and
   a resin molded body formed of a thermoplastic resin composition containing a thermoplastic resin and an additive, the resin molded body being bonded onto the oxygen-containing film,
   wherein the oxygen-containing film formed on the surface has an oxygen content measured with an EPMA within a range of from 0.1 wt % or more to 20 wt % or less,
   wherein the thermoplastic resin in the thermoplastic resin composition comprises any one kind or two or more kinds of resins selected from the group consisting of a polyphenylene sulfide-based resin, a polyether-based resin, a polyphenylene ether-based resin, a sulfone-based resin, and a polyphenylene oxide-based resin,
   wherein the additive in the thermoplastic resin composition is a carbonyl compound having a carbonyl group,
   wherein the resin molded body has a carbonyl group (C=O) as resulted from the additive, and
   wherein the oxygen-containing film comprises any one kind or two or more kinds of aluminum compound-containing films selected from: a film containing any one kind or two or more kinds of aluminum compounds selected from the group consisting of Al(OH)$_3$, AlO(OH), Al(PO$_4$), Al$_2$(HPO$_4$)$_3$, and Al(H$_2$PO$_4$)$_3$ derived from an aluminum film-forming treatment; a film containing a hydrogen bond between a hydroxy group on the aluminum substrate and a silanol group derived from the aluminum film-forming treatment; and a film containing an Al—O—Si bond derived from the aluminum film-forming treatment.

2. The aluminum-resin bonded body according to claim 1, wherein the oxygen-containing film comprises a film formed on the surface of the aluminum substrate by laser treatment.

3. The aluminum-resin bonded body according to claim 1, wherein a surface of the oxygen-containing film has a contact angle of 70° or less.

4. The aluminum-resin bonded body according to claim 1, wherein the resin molded body is bonded onto the oxygen-containing film by a bonding method based on injection molding or thermocompression bonding.

5. The aluminum-resin bonded body according to claim 1, wherein the carbonyl compound comprises any one kind or two or more kinds of compounds selected from the group consisting of carboxylic acids, esters, and acid amides.

6. A method of producing the aluminum-resin bonded body of claim 1, comprising:
   a film-forming step of forming an oxygen-containing film on a surface of an aluminum substrate formed of aluminum or an aluminum alloy; and
   a resin-molding step of forming a resin molded body on the oxygen-containing film of the surface-treated aluminum substrate obtained in the film-forming step, by injection molding of a thermoplastic resin composition containing a thermoplastic resin and an additive, so that the aluminum substrate and the resin molded body are bonded through intermediary of the oxygen-containing film,
   wherein the oxygen-containing film formed on the surface has an oxygen content measured with EPMA within a range of from 0.1 wt % or more to 20 wt % or less,
   wherein the thermoplastic resin in the thermoplastic resin composition comprises any one kind or two or more kinds of resins selected from the group consisting of a polyphenylene sulfide-based resin, a polyether-based resin, a polyphenylene ether-based resin, a sulfone-based resin, and a polyphenylene oxide-based resin, wherein the additive in the thermoplastic resin composition is a carbonyl compound having a carbonyl group, wherein the resin molded body has a carbonyl group (C=O) as resulted from the additive, and wherein the oxygen-containing film comprises any one kind or two or more kinds of aluminum compound-containing films selected from: a film containing any one kind or two or more kinds of aluminum compounds selected from the group consisting of $Al(OH)_3$, $AlO(OH)$, $Al(PO_4)$, $Al_2(HPO_4)_3$, and $Al(H_2PO_4)_3$ derived from an aluminum film-forming treatment; a film containing a hydrogen bond between a hydroxy group on the aluminum substrate and a silanol group derived from the aluminum film-forming treatment; and a film containing an Al—O—Si bond derived from the aluminum film-forming treatment.

7. The method of producing an aluminum-resin bonded body of claim 6, further comprising an aluminum-resin-bonding step of bonding the resin molded body obtained in the resin-molding step onto the oxygen-containing film of the surface-treated aluminum substrate obtained in the film-forming step, by thermocompression bonding.

8. The method of producing an aluminum-resin bonded body according to claim 6, wherein the film-forming step comprises forming, on the surface of the aluminum substrate formed of aluminum or an aluminum alloy, the oxygen-containing film containing any one kind or two or more kinds of aluminum compounds selected from $Al(OH)_3$, $AlO(OH)$, $Al(PO_4)$, $Al_2(HPO_4)_3$, and $Al(H_2PO_4)_3$ by treating the aluminum substrate by any one kind of the aluminum film-forming treatment selected from: warm water immersion treatment involving immersion in warm water at 50° C. or more for 60 seconds or more; water vapor treatment involving exposure to a water vapor atmosphere under pressurized conditions of 0.1 MPa or more and 1 minute or more; phosphoric acid treatment involving immersion in a phosphoric acid-based aqueous solution containing any one kind or two or more kinds of phosphate ion species selected from the group consisting of a phosphate ion, a monohydrogen phosphate ion, and a dihydrogen phosphate ion in a range of from 0.1 to 100 g/L for from 30 seconds to 30 minutes, followed by drying with hot air at from 80 to 400° C. for from 30 seconds to 30 minutes; and anodic oxidation treatment.

9. The method of producing an aluminum-resin bonded body according to claim 6, wherein the film-forming step comprises forming, on the surface of the aluminum substrate formed of aluminum or an aluminum alloy, an oxygen-containing film containing a hydrogen bond between an hydroxy group on an aluminum substrate and a silanol group and/or an oxygen-containing film containing an Al—O—Si bond by treating the aluminum substrate by any one kind of the aluminum film-forming treatment selected from silane coupling treatment and/or a silica treatment involving immersion in a solution containing 0.1 to 100 g/L of a silane coupling agent and/or colloidal silica for from 30 seconds to 30 minutes, followed by drying with hot air at from 80 to 400° C. for from 30 seconds to 30 minutes.

10. The method of producing an aluminum-resin bonded body according to claim 6, wherein the film-forming step comprises forming an oxygen-containing film by a laser treatment involving heating a vicinity of the surface of the aluminum substrate formed of aluminum or an aluminum alloy.

* * * * *